United States Patent
Huang et al.

(10) Patent No.: US 12,379,818 B2
(45) Date of Patent: Aug. 5, 2025

(54) METHOD AND APPARATUS FOR INFORMATION RELEASE, ELECTRONIC DEVICE, AND STORAGE MEDIUM

(71) Applicant: BEIJING BYTEDANCE NETWORK TECHNOLOGY CO., LTD., Beijing (CN)

(72) Inventors: Yipeng Huang, Beijing (CN); Chaopeng Liu, Beijing (CN); Niwen Zheng, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/438,855

(22) PCT Filed: Jun. 25, 2021

(86) PCT No.: PCT/CN2021/102434
§ 371 (c)(1),
(2) Date: Sep. 13, 2021

(87) PCT Pub. No.: WO2022/062515
PCT Pub. Date: Mar. 31, 2022

(65) Prior Publication Data
US 2022/0308707 A1    Sep. 29, 2022

(30) Foreign Application Priority Data
Sep. 27, 2020    (CN) .......................... 202011036265.9

(51) Int. Cl.
*G06F 3/048*    (2013.01)
*G06F 3/0481*    (2022.01)
(Continued)

(52) U.S. Cl.
CPC ........ *G06F 3/0481* (2013.01); *G06F 3/04842* (2013.01); *G06F 9/451* (2018.02); *G06F 16/958* (2019.01); *H04L 51/52* (2022.05)

(58) Field of Classification Search
CPC ...... G06F 3/0481; G06F 9/451; G06F 16/958; G06F 3/04842; H04L 51/52; G06Q 50/01; H04W 4/21
(Continued)

(56) References Cited

U.S. PATENT DOCUMENTS 11,172,338 B1 * 11/2021 Cheung .................. H04W 4/14
11,567,986 B1 *  1/2023 Underwood .......... G06F 16/435
(Continued)

FOREIGN PATENT DOCUMENTS

CN    102790922 A    11/2012
CN    107710270 A     2/2018
(Continued)

OTHER PUBLICATIONS

Porter, Dusty, "How to Pin a YouTube Comment to the Top—YouTube Tutorial", May 8, 2017, https://www.youtube.com/watch?v=Wcn5WRUafoo (Year: 2017).*
(Continued)

*Primary Examiner* — Patrick F Riegler

(57) ABSTRACT

Embodiments of the present disclosure provide a method for information release, an apparatus for information release, an electronic device and a storage medium. The method includes: receiving target information input by a music creator; and displaying the target information on a music-associated page. The target information includes a music introduction. With the technical solutions of the embodiments of the present disclosure, a purpose of supporting the music creator to release the music introduction in person is achieved, so that an interaction behavior between a user and
(Continued)

the music creator can be enhanced, an information interactivity is improved, and a purpose of guiding the user to consume music is achieved.

17 Claims, 5 Drawing Sheets

(51) Int. Cl.
  *G06F 3/04842* (2022.01)
  *G06F 9/451* (2018.01)
  *G06F 16/958* (2019.01)
  *H04L 51/52* (2022.01)

(58) Field of Classification Search
  USPC .......................................................... 715/751
  See application file for complete search history.

(56) References Cited

U.S. PATENT DOCUMENTS

| | | | | |
|---|---|---|---|---|
| 2006/0293909 | A1* | 12/2006 | Miyajima | G01D 5/345 709/204 |
| 2007/0143663 | A1* | 6/2007 | Hansen | G06F 40/171 715/233 |
| 2009/0094343 | A1* | 4/2009 | Mehrotra | G06F 15/16 709/207 |
| 2012/0005224 | A1* | 1/2012 | Ahrens | H04W 4/21 707/769 |
| 2014/0215352 | A1* | 7/2014 | Blecon | H04L 12/1827 715/752 |
| 2015/0302533 | A1* | 10/2015 | Thakur | G06Q 10/00 705/319 |
| 2016/0357355 | A1* | 12/2016 | Carrigan | G06Q 50/01 |
| 2017/0357501 | A1 | 12/2017 | Ledet | |
| 2018/0191645 | A1* | 7/2018 | Cacioppo | H04L 67/06 |
| 2019/0034950 | A1* | 1/2019 | Roux | G06Q 30/0282 |
| 2019/0171666 | A1 | 6/2019 | McKenzie | |
| 2020/0100165 | A1* | 3/2020 | Hosier, Jr. | H04W 72/04 |
| 2021/0042830 | A1* | 2/2021 | Burke | G06Q 20/384 |
| 2022/0208196 | A1* | 6/2022 | Verma | G10L 15/22 |
| 2022/0224983 | A1* | 7/2022 | He | H04N 21/8405 |
| 2022/0308707 | A1* | 9/2022 | Huang | H04L 51/52 |

FOREIGN PATENT DOCUMENTS

| | | | | |
|---|---|---|---|---|
| CN | 107995515 | A | 5/2018 | |
| CN | 109118320 | A | 1/2019 | |
| CN | 109917996 | A | 6/2019 | |
| CN | 110188232 | A | 8/2019 | |
| CN | 111447267 | A | 7/2020 | |
| CN | 112214706 | A | 1/2021 | |
| CN | 110188232 | B  * | 9/2021 | ............ G06F 16/61 |

OTHER PUBLICATIONS

Office Action issued Jun. 2, 2022 for CN Application No. 202011036265.9, 8 Pages.
Office Action issued Aug. 17, 2022 for CN Application No. 202011036265.9, 12 Pages.
Network Marketing, Lanhua Lu, 1st edition, Jul. 2017.
International Patent Application No. PCT/CN2021/102434, International Search Report mailed Sep. 26, 2021, 5 pages.
First Office Action issued Feb. 28, 2022 in Chinese Patent Application No. 202011036265.9 (with English translation).
Baidu Experience, "How to put comments on the top of station B," https://jingyan.baidu.com/article/cbcede07578b4702f40b4d89.html, Oct. 1, 2018 (with English translation).
Zhang, "PRD sharing: "NetEase Cloud Music—Comment Module" product requirements document," Knowing, Aug. 20, 2019, https://zhuanlan.zhihu.com/p/78902360 (with English translation).
Cheng, "Research on micro-blog marketing strategy of sports stars," Master's Thesis, Institute of Journalism, Jun. 2018 (with English translation).
Tong et al., "Research on the "Music Social" Mode of Mobile Platforms," Media Investigation Report, School of Journalism, Chongqing University, Issue 4, 2019.
Rejection Decision issued Nov. 21, 2022 in Chinese Patent Application No. 202011036265.9, with English translation (31 pages).
Office Action issued Sep. 22, 2023 in Chinese Patent Application No. P00202107551 with English translation (6 pages).
Examination Report issued Sep. 4, 2023 in IN App. No. 202127041250 (7 pages).
Office action received from Indonesia patent application No. P00202107551 mailed on Sep. 27, 2024, 6 pages (3 pages English Translation and 3 pages Original Copy).
International Search Report for International Application No. PCT/CN2021/117199, mailed Dec. 17, 2021, 5 pages.
Netease: "The Creator of the Musician Say Functional Tutorial Comprising," 9 Pages, Retrieved from URL: https://music.163.com/#/topicid+28816284.
Written Opinion for International Application No. PCT/CN2021/102434, mailed Sep. 26, 2021, 8 Pages.
Hearing Notice in Reference to IN Application No. 202127041250, dated Jun. 11, 2024 (4 pages).

* cited by examiner

METHOD AND APPARATUS FOR INFORMATION RELEASE, ELECTRONIC DEVICE, AND STORAGE MEDIUM

This application is a U.S. 371 Application of International Patent Application No. PCT/CN2021/102434, filed on 25 Jun. 2021, which application claims the priority of the Chinese Patent Application No. 202011036265.9, titled "METHOD AND FOR INFORMATION RELEASE, APPARATUS, ELECTRONIC DEVICE, AND STORAGE MEDIUM" filed with the China National Intellectual Property Administration on Sep. 27, 2020, which are incorporated herein by reference in their entireties.

TECHNICAL FIELD

The present disclosure relates to a field of computer technologies, and particularly, to a method for information release, an apparatus for information release, an electronic device, and a storage medium.

BACKGROUND

With the development of the internet and terminals, users usually install a music client in a terminal such as a mobile phone, in order to listen to music, post comments on the music, and the like through the music client.

Accordingly, developers of respective music clients endeavor to design the music client in various styles, in order to attract more users to use the music client developed by them and to encourage users to consume the music in the music client. However, at present, user has low interaction enthusiasm regarding a creation story behind the music, failing to better stimulate user's enthusiasm for consumption.

SUMMARY

Embodiments of the present disclosure provide a method for information release, an apparatus for information release, an electronic device, and a storage medium, achieving a purpose of supporting the music creator to release the music introduction in person. Thus, an interaction behavior between the user and the music creator can be increased, an information interactivity is improved, and a purpose of guiding the user to consume music is achieved.

In a first aspect, embodiments of the present disclosure provide a method for information release. The method includes: receiving target information input by a music creator; and displaying the target information on a music-associated page. The target information includes a music introduction.

In a second aspect, the embodiments of the present disclosure further provide an apparatus for information release. The apparatus includes: a target information receiving module configured to receive target information input by a music creator; and a first display module configured to display the target information on a music-associated page. The target information includes a music introduction.

In a third aspect, the embodiments of the present disclosure further provide an electronic device. The electronic device includes: one or more processors; and a storage apparatus configured to store one or more program. The one or more programs, when executed by the one or more processors, cause the one or more processors to implement the method for information release according to any one of embodiments of the present disclosure.

In a fourth aspect, the present disclosure further provides a storage medium, containing computer-executable instructions. The computer-executable instructions, when executed by a computer processor, implement the method for information release according to any one of embodiments of the present disclosure.

In a fifth aspect, provided is a computer program product, including computer program instructions. The computer program instructions enable a computer to implement the method for information release according to any one of embodiments of the present disclosure.

In a sixth aspect, provided is a computer program, which when running on a computer, enables the computer to implement the method for information release according to any one of embodiments of the present disclosure.

According to the technical solution of the embodiments of the present disclosure, the target information input by the music creator is received, the target information is displayed on the music-associated page, and the target information includes a technical means of the music introduction, thereby achieving the purpose of supporting the music creator to release the music introduction in person. Thus, the interaction behavior between the user and the music creator can be increased, the information interactivity is improved, and the purpose of guiding the user to consume music is achieved.

BRIEF DESCRIPTION OF DRAWINGS

The above and other features, advantages, and aspects of embodiments of the present disclosure will become more apparent by referring to the following detailed description in conjunction with the accompanying drawings. Throughout the drawings, the same or similar reference numbers refer to the same or similar elements. It should be understood that the drawings are illustrative, and the elements and components are not necessarily drawn to scale.

DESCRIPTION OF EMBODIMENTS

Figure 1:
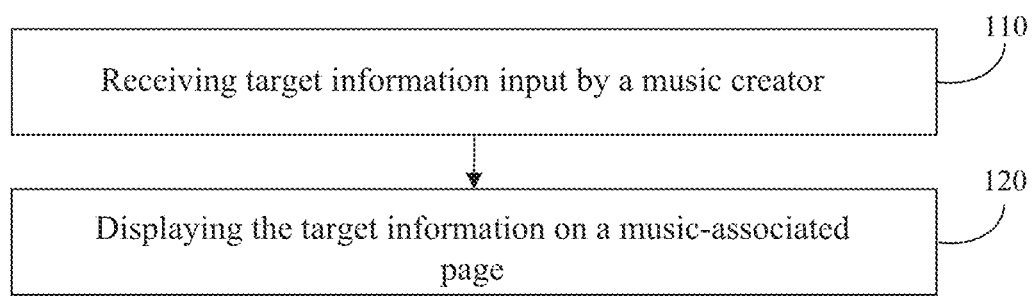
FIG. 1 is a flowchart illustrating a method for information release according to Embodiment 1 of the present disclosure.

Embodiments of the present disclosure will be described in more detail below with reference to the accompanying drawings. While certain embodiments of the present disclosure are illustrated in the drawings, it should be understood that the present disclosure may be embodied in various forms and should not be construed as limited to the embodiments set forth herein, but rather are provided for a more complete and thorough understanding of the present disclosure. It should be understood that the drawings and the embodiments of the present disclosure are for illustration purposes only and are not intended to limit the scope of the present disclosure.

It should be understood that various steps recited in embodiments of the method of the present disclosure may be performed in a different order, and/or performed in parallel. Moreover, the embodiments of the method may include additional steps and/or omit performing the illustrated steps. The scope of the present disclosure is not limited in this respect.

A term "including" and variations thereof as used herein are open-ended, i.e., "including but not limited to". The term "based on" means "based at least in part on". The term "one embodiment" means "at least one embodiment"; the term "another embodiment" means "at least one additional embodiment"; the term "some embodiments" means "at least some embodiment". Relevant definitions for other terms will be given in the following description.

It should be noted that the terms "first", "second", and the like in the present disclosure are only used for distinguishing different apparatuses, modules, or units, and are not used for limiting the order or interdependence of the functions performed by the apparatuses, modules or units.

It should be noted that term "a", "an", or "plurality of" in the present disclosure is illustrative rather than limiting, which shall be construed as "one or more" by that those skilled in the art, unless clearly indicated otherwise.

Embodiment 1

FIG. 1 is a flowchart of a method for information release according to Embodiment 1 of the present disclosure. The method can be applied to a situation when a music creator personally writes a creation story behind the music through a music client and releases the written music introduction on a music-associated page. The method may be executed by an apparatus for information release, which may be embodied as software and/or hardware, and is generally integrated in the music client and/or a server corresponding to the music client.

As illustrated in FIG. 1, the method for information release provided by the present embodiment includes the following steps.

In step 110, target information input by a music creator is received, where the target information includes a music introduction.

The music creator can input the target information through a music-associated page.

Illustratively, the music-associated page includes at least one of a music comment page and a music details page.

It can be understood that the music details page typically includes singer information, lyricist information, composer information, etc. of the music, and the music comment page usually includes information about user's comments on a music, or information about interaction between different users with respect to some comment information. Thus, the music comment page may be understood as an interaction page, and on the music comment page, the users can post their own opinions, ideas and the like about the music and can also reply, like, or share comment information of other users.

Therefore, it is preferable to receive the music introduction input by the music creator based on the music comment page, and to display the music introduction on the music comment page. The interactivity between the user and the music creator can be enhanced in such a manner that the music creator is supported to input his/her own inspirations, ideas, and the creation story behind the music (i.e., the music introduction) by inputting comments on the music comment page. The music creators are artists or celebrities, whom are sought after by most users, and the most users are fans of these artist or celebrities. Thus, the users expect to be able to directly communicate with their favorite artist or celebrities. Therefore, if the music introduction is written and released by the music creator personally, on the one hand, the users are greatly promoted to reply to the music introduction, and after the reply, the reply contents and notifications can be correspondingly displayed on the music comment page of the music creator, thereby achieving the purpose of direct communication between the users and the music creator. On the other hand, since the music introduction is published on the music comment page by means of posting comments and by using comments as a carrier, the music introduction can attract attention of more users.

Figure 2:
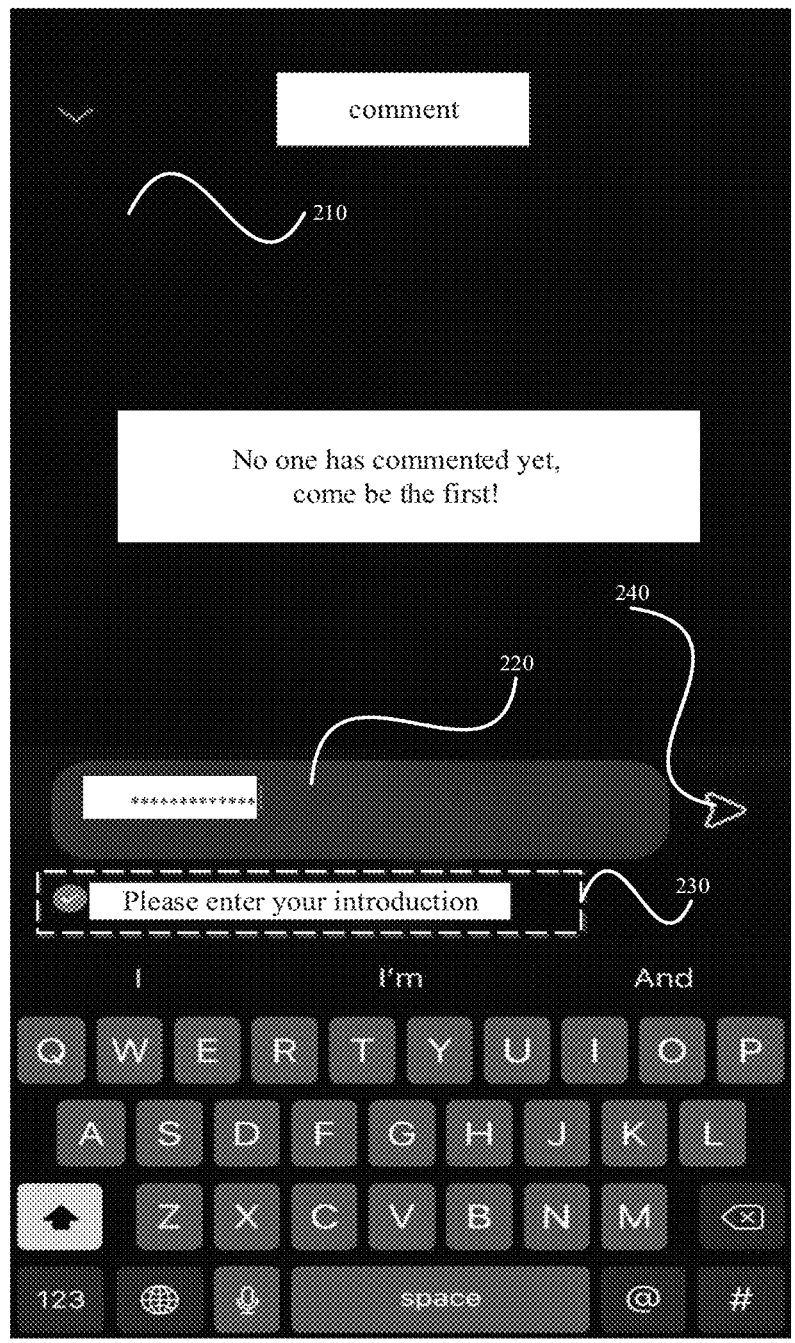
FIG. 2 is a schematic diagram illustrating an interface for a music creator to input a music introduction based on a music comment page according to Embodiment 1 of the present disclosure.

Specifically, prior to displaying the target information on the music-associated page, the method further includes: receiving a selection instruction displayed in an option box of the music comment page. The option box is configured to identify the target information as the music introduction. If the option box is selected, the target information is displayed on the top of the music comment page, and a prompt icon such as a flip animation of a profile photo of the music creator is displayed on a music-playing page in a linkage manner, in order to prompt the user that the music creator has released a music introduction, which can be viewed one the related page. Typically, if the user triggers the flip animation the user jumps to a page displaying the music introduction. And if the option box is not selected, the target information is released as common comment information of the music and not displayed on the top, and the prompt icon is not displayed on the music-playing page in a linkage manner. Usually, a selection authority of the option box is only open to the music creator, and ordinary users do not have the authority to select the option box. FIG. 2 is a schematic diagram illustrating an interface for the music creator to input the music introduction based on the music comment page. Correspondingly, referring to FIG. 2, the music author inputs his/her own thoughts (i.e., the music introduction) at the time of creating the music in a text input box 220 displayed on the music comment page 210. After completing the input, the music author selects the option box 230 for identifying the input information as the music introduction, and finally clicks a "release" 240 to complete the releasing of the music introduction. That is, an editing authority is open to the invited artists (music creators) of the music client, and the invited artists can select the option box 230 on the music comment page to release the information input by himself/herself as the music introduction.

If one same piece of music has multiple creators and each creator releases a music introduction, the music introductions released by different creators are displayed, separately. It can be understood that, due to a limited display area of the music comment page, in order to balance a size of the display area between the music introduction and the comment information posted by the users, in the case of that one same piece of music has multiple creators, a certain strategy may be adopted to limit the display of the music introduction. For example, a font of the music introduction may be reduced, or the music creators agree to separately display the music introductions of respective music creators in different time intervals, or the music introduction of only one music creator may be limited to be displayed, that is, one piece of music only supports one creator to release one music introduction.

Further, after the music creator releases the music introduction, the music creator is allowed to perform editing operations such as modification, deletion, and the like on the released music introduction. The editing operation may be to triggered by long pressing a text portion of the music introduction, or displaying an "edit" button at an associated position of the display area of the music introduction and triggering the "edit" button by the creator to activate the editing operation on the released music introduction.

Illustratively, an editing interface for the target information is displayed in response to receiving a second trigger instruction for the target information.

In step 120, the target information is displayed on the music-associated page.

As an example, when the music-associated page is a music comment page, the music introduction released by the music creator is displayed on the top of the music comment page, so that the user may pay attention to the music introduction released by the music creator in time, the user is guided to interact with the music creator, and enthusiasm for interaction between the user and the music creator is stimulated.

Further, in order to guide each user to view the music introduction released by the music creator, a comment button is displayed on the music-playing page; and it jumps to the music comment page in response to receiving a trigger instruction for the comment button. Furthermore, set effects can also be displayed in an associated position of the comment button to prompt the user that the music creator releases a music introduction. The set effect is, for example, a flipping animation of an identification of the music creator, and the identification includes a profile photo, an authentication identification such as a V authentication or MVP (Most Valuable Player) identification, and/or a nickname. The set effects may also be any other effects that can be used as an eye-catching prompting, such as a red dot displayed in a shaking way. The associated position of the comment button may be the position of the comment button. By displaying the flip animation of the profile photo of the music creator at this position, it can play a role in attracting the user's attention, thereby stimulating the user's enthusiasm for clicking on the flip animation of the profile photo of the music creator. When the user clicks on the flip animation of the profile photo of the music creator, it jumps to the music comment page, the music introduction released by the music creator in person is displayed on the top of the music comment page, thereby achieving a purpose of guiding the user to timely check the music introduction released by the music creator in person, and further enhancing the enthusiasm for interaction between the user and the music creator.

To further stimulate the enthusiasm for the interaction between the user and the music creator, illustratively, the identification of the music creator, such as the profile photo, the authentication identification, and/or the nickname, is displayed at a first associated position of the display area for the target information, so that the user knows that the music introduction was personally released by the music creator, and the user can communicate with the music creator through the music introduction.

Figure 3:
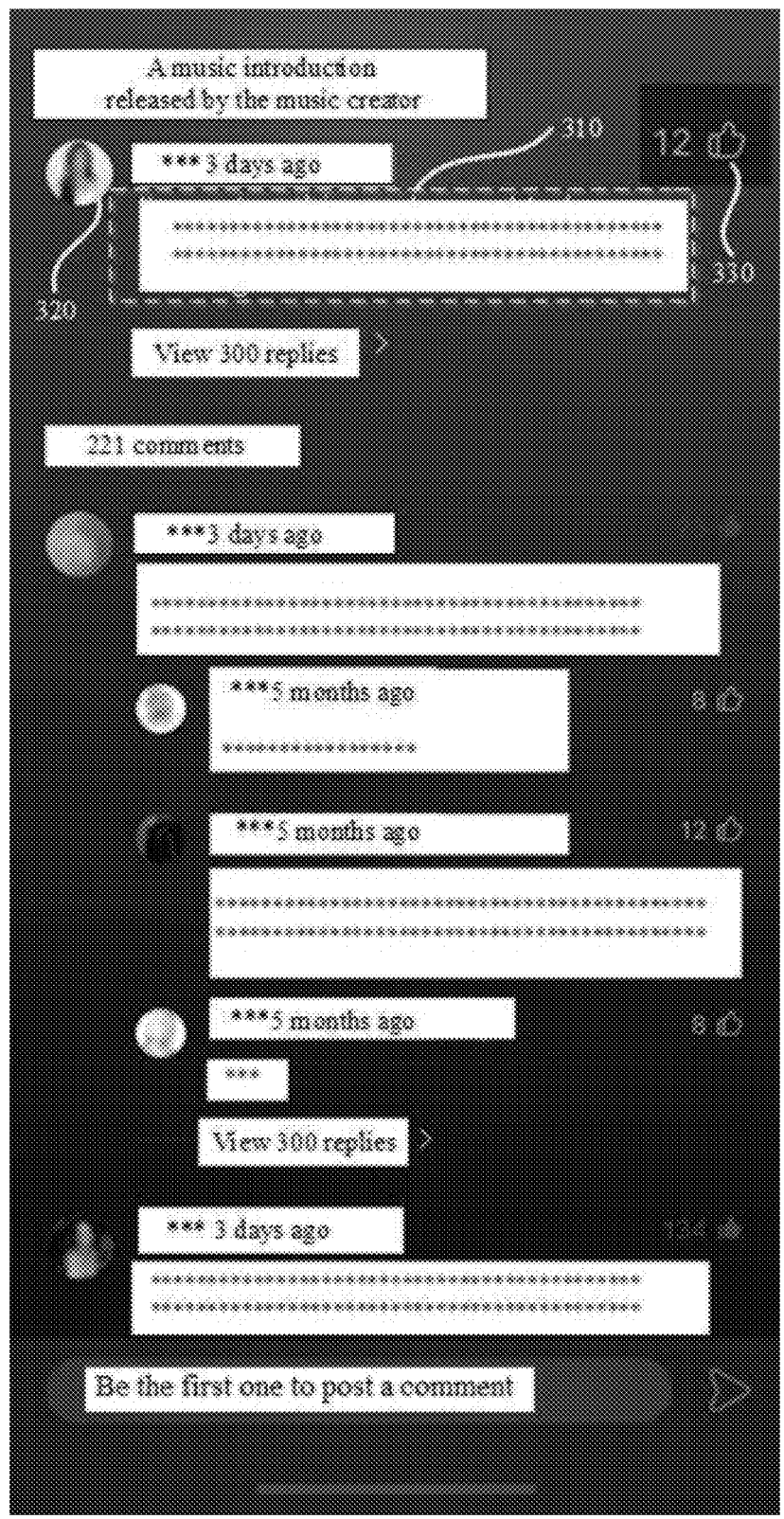
FIG. 3 is a schematic diagram illustrating an interface of target information displayed on a music comment page according to Embodiment 1 of the present disclosure.

Furthermore, in order to enhance the interactivity of the user, an interaction button can be displayed at a second associated position of the display area for the target information. The user interacts with the music creator through the interaction button. The interaction button includes at least one of a like button, a share button, and a reply button. FIG. 3 is a schematic diagram illustrating an interface of the target information displayed on the music comment page. Correspondingly, referring to FIG. 3, the reference numeral 310 represents the music introduction released by the music creator, and the profile photo, authentication identifier, and nickname of the music creator are displayed at the first associated position 320 of the music introduction 310; and an interaction button such as a like button 330 is displayed at the second associated position on the music introduction 310, and the music introduction 310 can be liked by triggering the like button 331.

Further, the interaction between the user and the music creator through the music introduction may also be accomplished by clicking on a text portion of the music introduction. Illustratively, a reply interface for the target information pops up in response to receiving a first trigger instruction for the target information. Specifically, the first trigger instruction includes a click instruction. If the user clicks on the text portion of the music introduction, the reply interface for the music introduction pops up, and the user can input a content which the user wants to interact with the music creator through the reply interface. If the user releases reply information for the music introduction, the reply information is displayed on the music comment page in real time, and a prompt and a notice are sent to the music client of the music creator in a certain manner to prompt the music creator that the music introduction received a reply from other users and remind the music creator to check the music introduction in time. In addition, in order to facilitate the music creator to interact with the user who sent the reply information sent by the user, the reply information sent by the users are all deposited in a message center of the music client of the music creator. If the music creator clicks on one piece of the reply information, he/she will directly jump to a page for replying this reply information. The possibility of interaction between the music creator and other users is improved by simplifying the music creator's operation for replying the reply information. The way to send the prompt and notification to the music client of the music creator may be sending the prompt in a form of sending a message through Inbox, or sending the prompt in a form of bubbles. Specifically, a bubble appears when the music creator opens the music client, and a prompt content is displayed in the bubble, for example, the prompt content is that "You have a replay to your music introduction from Zhang San, go check it out", or the prompt content is displayed in a pop-up window.

Further, if a single playing duration of the music associated with the target information exceeds a duration threshold value or the music has the music introduction written by the music creator, the comment button is highlighted on the music-playing page to prompt the user to jump to the music comment page by triggering the comment button, and the like button and/or the number of likes are highlighted on the music comment page to enhance the interactivity of the user.

According to the technical solution of the embodiment of the present disclosure, the target information input by the music creator is received, and the target information is displayed on the music-associated page, where the target information includes a music introduction, achieving the purpose of supporting the music creator to release the music introduction in person is achieved. Thus, the interaction behavior between the user and the music creator can be increased, the information interactivity is improved, and the purpose of guiding the user to consume music is achieved.

Embodiment 2

Figure 4:
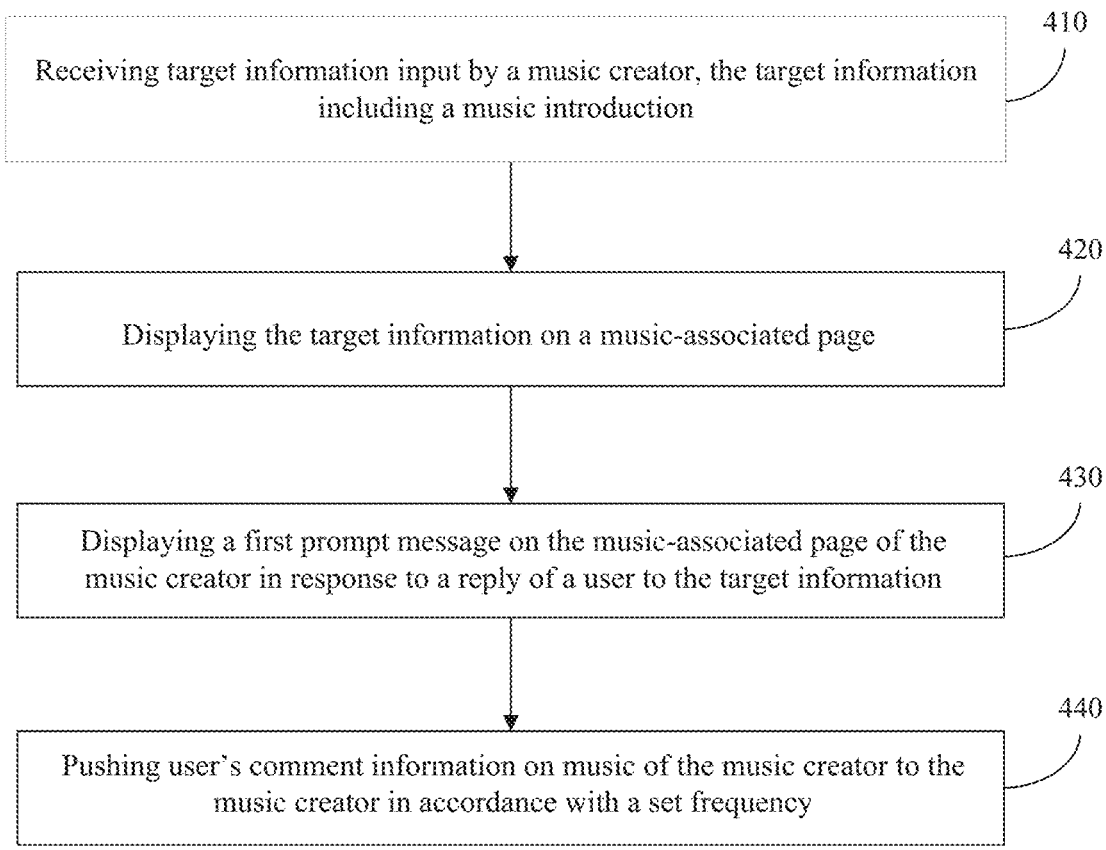
FIG. 4 is a flowchart illustrating a method for information release provided by Embodiment 2 of the present disclosure.

FIG. 4 is a flowchart illustrating a method for information release provided by Embodiment 2 of the present disclosure.

The present embodiment further optimizes the solution on the basis of the above-mentioned embodiment, and particularly, adds a step of prompting reply information and pushing a notification message that other users have made a comment on the music to the music creator, thereby further increasing the possibility of interaction between the music creator and fan users.

As illustrated in FIG. 4, the method includes the following steps.

In step 410, the target information input by the music creator is received, the target information including the music introduction.

In step 420, the target information is displayed on the music-associated page.

In step 430, a first prompt message is displayed on the music-associated page of the music creator in response to a reply of the user to the target information.

In step 440, user's comment information on the music of the music creator is pushed to the music creator in accordance with a set frequency.

Specifically, said pushing the user's comment information on the music of the music creator to the music creator includes the following steps: determining an account of the music creator based on a music associated with the target information; and pushing the comment information to the account.

It can be understood that each piece of music is configured with a unique identification ID, and there is an association relationship between each piece of music and an account of the creator thereof and between each piece of music and the music introduction released by the creator. Based on the association relationship, the associated music ID is determined according to the music introduction, and then the account of the creator is determined based on the music ID and the association relationship between the music and the account of the creator, and the comment information released by the user on the music of the creator is further pushed to the account of the creator.

The first prompt message is displayed on the music-associated page of the music creator in any form of bubble, short message, pop-up window, and pop-up screen. The displaying of the second prompt message in an application of the music creator may specifically be displaying the second prompt message in a set manner in a message center of the application of the music creator, where the set manner includes any one of the bubble manner, the short message manner, the pop-up window manner, and the pop-up screen manner.

In order to facilitate the music creator to interact with the reply information sent by the user or the user's comment information on the music of the music creator, the reply information and the comment information sent by the user are all deposited in the message center of the music client of the music creator. If the music creator clicks on a certain piece of the information, it directly jumps to the page for replying the information. The possibility of interaction between the music creator and other users is improved by simplifying the music creator's operation for replying the information. The short message manner is specifically sending the prompt by sending a message to the Inbox, the bubble manner is sending the prompt in a form of bubble. Specifically, the bubble appears when the music creator opens the music client, and a prompt content is displayed in the bubble, for example, the prompt content is that "You have a replay to your music introduction from Zhang San, go check it out", or the prompt content is displayed in a form of pop-up window. Due to the high popularity of the music creator, a large number of users posts comments on the music or released music introduction of the music creator, and the prompt message may be set to be sent at a certain frequency, for example, once every hour, in order to avoid the trouble of persistently sending the prompt messages to the music creator.

In the technical solution of the embodiment of the present disclosure, the step of prompting the reply information is added on the basis of the above-mentioned embodiment. Specifically, if the user replies to the target information, the first prompt message is displayed on the music-associated page of the music creator in a set mode, and the second prompt message of other users' comments on the music of the music creator is pushed to the music creator. In this way, the possibility of interaction between the music creator and the fan user is further increased.

Embodiment 3

Figure 5:
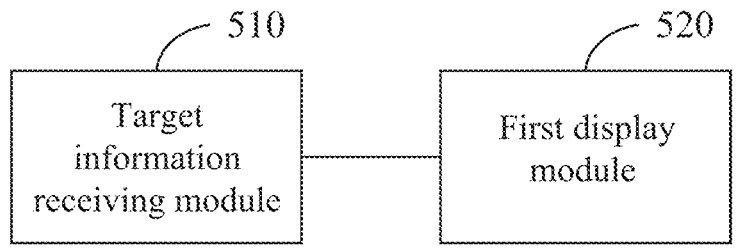
FIG. 5 is a schematic diagram illustrating an apparatus for information release according to Embodiment 3 of the present disclosure.

FIG. 5 illustrates an apparatus for information release according to Embodiment 3 of the present disclosure. The apparatus includes a target information receiving module 510 and a first display module 520.

The target information receiving module 510 is configured to receive target information input by a music creator. The first display module 520 is configured to display the target information on a music-associated page. The target information includes a music introduction.

On the basis of the above technical solutions, the music-associated page includes at least one of a music comment page and a music details page.

On the basis of respective technical solutions, the apparatus further includes a selection instruction receiving module. The selection instruction receiving module is configured to receive a selection instruction displayed in an option box of the music comment page. The music-associated page includes the music comment page, and the option box is configured to identify the target information as the music introduction.

On the basis of the above technical solutions, the first display module 520 includes a first display unit configured to display the target information on the top of the music comment page, and a second display unit configured to display an identification of the music creator at a first associated position of a display area of the target information.

On the basis of respective technical solutions, the apparatus further includes a second display module configured to display a comment button on a music-playing page, and a jumping module configured to jump to the music comment page in response to receiving a trigger instruction for the comment button.

On the basis of the above technical solutions, the second display module is further configured to display set effects in an associated position of the comment button to prompt the user that the music creator releases the music introduction. The identification includes a profile photo, an authentication identification, and/or a nickname.

On the basis of the above technical solutions, the apparatus further includes a third display module configured to display an interaction button at a second associated position of the display area for the target information.

The user interacts with the music creator through the interaction button.

The interaction button includes at least one of a like button, a share button, and a reply button.

On the basis of the above technical solutions, the apparatus further includes a pop-up module configured to pop up a reply interface for the target information in response to receiving a first trigger instruction for the target information.

On the basis of the above technical solutions, the apparatus further includes a fourth display module configured to display an editing interface for the target information in response to receiving a second trigger instruction for the target information.

On the basis of the above technical solutions, the apparatus further includes a fifth display module configured to display a first prompt message on the music-associated page of the music creator in response to a reply of a user to the target information.

On the basis of the above technical solutions, the apparatus further includes a pushing module configured to push user's comment information on music of the music creator to the music creator in accordance with a set frequency.

On the basis of the above technical solutions, the pushing module includes a determining unit configured to determine an account of the music creator based on a music associated with the target information, and a pushing unit configured to push the comment information to the account.

On the basis of the above technical solutions, the first display module 520 is specifically configured to separately display the target information input by different creators on the music-associated page when one same piece of music has at least two creators.

In the technical solution of the embodiment of the present disclosure, the target information input by the music creator is received, and the target information is displayed on the music-associated page, where the target information includes a music introduction, thereby achieving the purpose of supporting the music creator to release the music introduction in person. Thus, the interaction behavior between the user and the music creator can be increased, the information interactivity is improved, and the purpose of guiding the user to consume music is achieved.

The apparatus for information release provided by the embodiment of the present disclosure can implement the method for information release provided by any embodiment of the present disclosure, and has corresponding functional modules and beneficial effects for implementing method.

It should be noted that, the units and modules included in the apparatus are merely divided according to functional logic, but are not limited to the above division as long as the corresponding functions can be implemented. In addition, specific names of the functional units are also only used for distinguishing one functional unit from another, and are not used for limiting the protection scope of the embodiments of the present disclosure.

Embodiment 4

Figure 6:
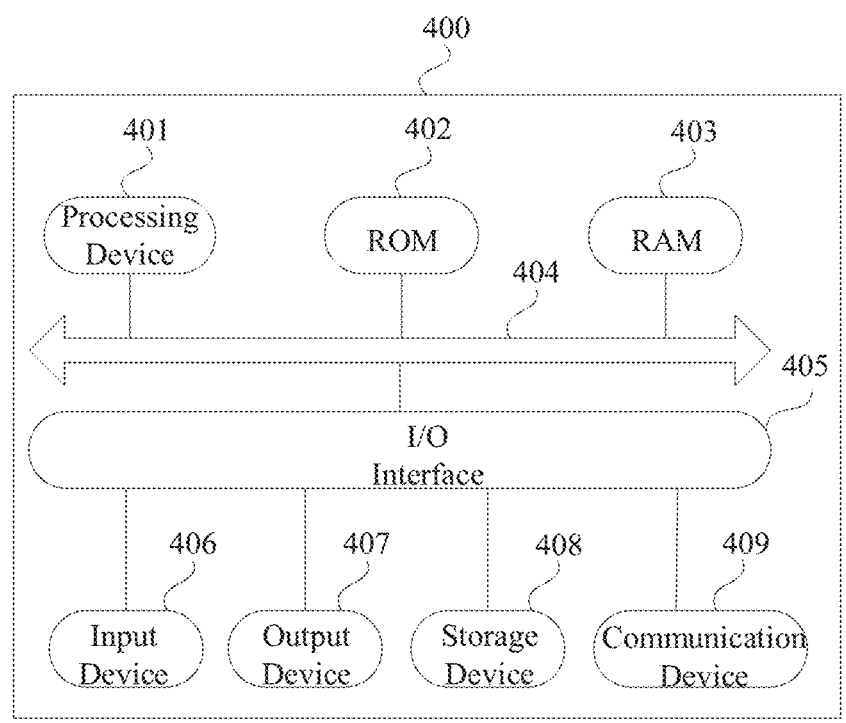
FIG. 6 is a schematic diagram illustrating an electronic device according to Embodiment 4 of the present disclosure.

Reference is now made to FIG. 6, which is a schematic diagram illustrating an electronic device 400 (e.g., a terminal device or a server in FIG. 6) adapted to implement the embodiments of the present disclosure. The terminal device according to the embodiment of the present disclosure may include, but not limited to, a mobile terminal such as a mobile phone, a laptop computer, a digital broadcast receiver, a Personal Digital Assistant (PDA), a tablet computer or PAD, a Portable Multimedia Player (PMP), or a vehicle-mounted terminal (e.g., a vehicle-mounted navigation terminal), or a fixed terminal such as a digital TV, a desktop computer, etc. The electronic device illustrated in FIG. 6 is exemplary only, and should not be construed as limiting the function and scope of use of the embodiments of the present disclosure.

As illustrated in FIG. 6, the electronic device 400 may include a processing apparatus (e.g., a central processing unit, a graphics processor, etc.) 401, which may perform various appropriate actions and processes in accordance with programs stored in a Read Only Memory (ROM) 402 or loaded from a storage device 408 into a Random Access Memory (RAM) 403. In the RAM 403, various programs and data required for operation of the electronic device 400 may also be stored. The processing device 401, the ROM 402, and the RAM 403 are connected to each other through a bus 404. An input/output (I/O) interface 405 is also connected to bus 404.

Generally, the following devices may be connected to the I/O interface 405: an input device 406 including, for example, a touch screen, a touch pad, a keyboard, a mouse, a camera, a microphone, an accelerometer, a gyroscope, etc.; an output device 407 including, for example, a Liquid Crystal Display (LCD), a speaker, a vibrator, and the like; a storage device 408 including, for example, a magnetic tape, a hard disk, etc.; and a communication device 409. The communication device 409 may allow the electronic device 400 to perform wireless or wired communication with other devices for data exchange. Although FIG. 6 illustrates the electronic device 400 having various devices, it can be appreciated that it is not necessary to implement or provide all the illustrated devices. Alternatively, more or fewer devices may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a computer-readable medium. The computer program includes program codes for implementing the method illustrated in any of the flowcharts. In these embodiments, the computer program may be downloaded and installed from a network through the communication device 409, or installed from the storage device 408, or installed from the ROM 402. When the computer program is executed by the processing device 401, the above-mentioned functions defined in the methods according to the embodiments of the present disclosure are performed.

The terminal provided in the embodiment of the present disclosure and the method for information release provided in the above embodiments belong to the same inventive concept, and technical details not described in this present embodiment of the present disclosure may refer to the above embodiments, and this embodiment of the present disclosure has the same beneficial effects as the above embodiments.

Embodiment 5

This embodiment of the present disclosure provides a computer storage medium on which a computer program is stored. The computer program, when executed by a computer processor, implements the method for information release provided by the above embodiments.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, which may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), or any suitable combination thereof.

In some embodiments, the client and the server may communicate using any currently known or future-developed network protocol, such as HTTP (HyperText Transfer Protocol), and may be in communication interconnection with digital data in any form or medium (e.g., a communication network). Examples of communication networks include a Local Area Network ("LAN"), a Wide Area Network ("WAN"), the Internet work (e.g., the Internet), and an end-to-end network (e.g., ad hoc end-to-end network), as well as any currently known or future-developed network.

The above-mentioned computer readable medium may be contained in the above-mentioned electronic device, or it may be separated and not assembled into the electronic device.

The above-mentioned computer readable medium carries one or more programs which, when executed by the electronic device, cause the electronic device to receive target information input by the music creator, and display the target information on the music-associated page. The target information includes the music introduction.

The computer program codes for implementing the operations according to the embodiments of the present disclosure may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

The flowcharts and block diagrams in the accompanying drawings illustrate architectures, functions, and operations of possible implementations of systems, methods, and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It should also be noted that, in some alternative implementations, the functions showed in blocks may occur in an order other than the order illustrated in the drawings. For example, two blocks illustrated in succession may actually be executed substantially in parallel with each other, or sometimes even in a reverse order, depending on functions involved. It should also be noted that each block in the block diagrams and/or flowcharts, or any combination of the blocks in the block diagrams and/or flowcharts, may be implemented using a dedicated hardware-based system configured to perform specified functions or operations or may be implemented using a combination of dedicated hardware and computer instructions.

The units involved and described in the embodiments of the present disclosure may be embodied as software or hardware. The name of a unit does not constitute a limitation on the unit itself under certain circumstances. For example, an editable content display unit may also be described as an "editing unit".

The functions described herein above may be performed, at least in part, by one or more hardware logic components. For example, without limitation, exemplary types of suitable hardware logic components include a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In the context of this disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of a machine-readable storage medium would include an electrical connection having one or more wires, a portable computer disk, a hard disk, a Random Access Memory (RAM), a Read Only Memory (ROM), an Erasable Programmable Read Only Memory (EPROM) or flash memory, an optical fiber, a Compact Disc Read Only Memory (CD-ROM), an optical memory device, a magnetic memory device, or any suitable combination thereof.

According to one or more embodiments of the present disclosure, [Example 1] provides a method for information release, including: receiving target information input by a music creator; and displaying the target information on a music-associated page, the target information includes a music introduction.

According to one or more embodiments of the present disclosure, [Example 2] provides a method for information release, optionally, the music-associated page includes at least one of a music comment page and a music details page.

According to one or more embodiments of the present disclosure, [Example 3] provides a method for information release, optionally, further comprising, prior to displaying the target information on the music-associated page: receiving a selection instruction displayed in an option box of the music comment page, in which the music-associated page includes a music comment page, and the option box is configured to identify the target information as the music introduction.

According to one or more embodiments of the present disclosure, [Example 4] provides a method for information release, optionally, said displaying the target information on the music-associated page includes: displaying the target information on top of the music comment page; and displaying an identification of the music creator at a first associated position of a display area for the target information.

According to one or more embodiments of the present disclosure, [Example 5] provides a method for information release, optionally, further including: displaying a comment button on a music-playing page; and jumping to the music comment page in response to receiving a trigger instruction for the comment button.

According to one or more embodiments of the present disclosure, [Example 6] provides a method for information release, optionally, further including: displaying set effects in an associated position of the comment button to prompt a user that the music creator releases the music introduction.

According to one or more embodiments of the present disclosure, [Example 7] provides a method for information release, optionally, the identification includes a profile photo, an authentication identification, and/or a nickname.

According to one or more embodiments of the present disclosure, [Example 8] provides a method for information release, optionally, further including: displaying an interaction button at a second associated position of a display area for the target information, where the user interacts with the music creator through the interaction button.

According to one or more embodiments of the present disclosure, [Example 9] provides a method for information release, optionally, the interaction button includes at least one of a like button, a share button, and a reply button.

According to one or more embodiments of the present disclosure, [Example 10] provides a method for information release, optionally, further including: popping up a reply interface for the target information in response to receiving a first trigger instruction for the target information.

According to one or more embodiments of the present disclosure, [Example 11] provides a method for information release, optionally, further including: displaying an editing interface for the target information in response to receiving a second trigger instruction for the target information.

According to one or more embodiments of the present disclosure, [Example 12] provides a method for information release, optionally, further including: displaying a first prompt message on the music-associated page of the music creator in response to a reply of a user to the target information.

According to one or more embodiments of the present disclosure, [Example 13] provides a method for information release, optionally, further including: pushing user's comment information on music of the music creator to the music creator in accordance with a set frequency.

According to one or more embodiments of the present disclosure, [Example 14] provides a method for information release, optionally, said pushing the user's comment information on the music of the music creator to the music creator includes: determining an account of the music creator based on a music associated with the target information; and pushing the comment information to the account.

According to one or more embodiments of the present disclosure, [Example 15] provides a method for information release, optionally, further including: when one same piece of music has at least two creators, displaying the target information input by different creators of the at least two creators on the music-associated page, respectively.

According to one or more embodiments of the present disclosure, [Example 16] provides an apparatus for information release, including: a target information receiving module configured to receive target information input by a music creator; and a first display module configured to display the target information on a music-associated page, where the target information includes a music introduction.

According to one or more embodiments of the present disclosure, [Example 17] provides an electronic device, including: one or more processors; and a storage apparatus configured to store one or more programs the one or more programs, which, when executed by the one or more processors, cause the one or more processors to implement the following method for information release. The method includes: receiving target information input by a music creator; and displaying the target information on a music-associated page, where the target information includes a music introduction.

According to one or more embodiments of the present disclosure, [Example 18] provides a storage medium containing computer-executable instructions, which, when executed by a computer processor, implement the following method for information release. The method includes: receiving target information input by a music creator; and displaying the target information on a music-associated page, where the target information includes a music introduction.

The above description is only intended to explain the preferred embodiments of the present disclosure and the employed principles of the technology. It will be appreciated by those skilled in the art that the scope of the present disclosure herein is not limited to t the technical solutions formed by the specific combination of the above technical features, but should also encompass any other combinations of features described above or equivalents thereof without departing from the above concept of the present disclosure. For example, the above features and the technical features disclosed in the present disclosure having similar functions (but not limited to them) are replaced with each other to form the technical solution.

Further, although the operations are depicted in a specific order, this should not be understood as requiring these operations to be performed in the specific order illustrated or in a sequential order. Under certain circumstances, multitasking and parallel processing may be advantageous. Likewise, although several specific implementation details are included in the above discussion, these should not be construed as limitations on the scope of the present disclosure. Certain features that are described in the context of separate embodiments can also be implemented in combination in a single embodiment. Conversely, various features described in the context of a single embodiment can also be implemented in multiple embodiments separately or in any suitable combination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A method for information release, applied in a user terminal, comprising:
   receiving, by the user terminal, target information input by a music creator, wherein the target information is to be released through a communication network; and
   displaying, by the user terminal, the target information released on a music-associated page, wherein the target information comprises a music introduction, and the music-associated page comprises a music comment page which is able to display music comments from different users including the music creator,
   wherein the method further comprises, after the receiving, by the user terminal, the target information input by the music creator:
   receiving, by the user terminal, a selection instruction displayed in an option box of the music comment page, the option box being configured to identify the target information as the music introduction to be released through the communication network; and
   receiving, by the user terminal, a click on a release icon on the music comment page, the release icon being configured to trigger a release of the target information through the communication network,
   wherein the displaying, by the user terminal, the target information released on the music-associated page comprises:
   releasing, by the user terminal only on the top of the music comment page, the target information identified as the music introduction and keeping it displayed on the top of the music comment page, in response to the option box having been selected and the release icon being clicked, wherein
   in response to the option box having been selected and the release icon being clicked, a prompt icon is displayed on a music-playing page of another user terminal in a linkage manner to prompt another user that the music creator has released the music introduction on the music comment page, and
   the another user jumps to the music comment page with the music introduction displayed on the top, in response to the prompt icon on the music-playing page being triggered.

2. The method according to claim 1, wherein the music-associated page comprises at least one of a music comment page and a music details page.

3. The method according to claim 1, wherein displaying the target information released on the music-associated page comprises:
   displaying an identification of the music creator at a first associated position of a display area for the target information.

4. The method according to claim 1, further comprising:
   displaying a comment button on a music-playing page; and
   jumping to the music comment page in response to receiving a trigger instruction for the comment button.

5. The method according to claim 4, further comprising:
   displaying set effects in an associated position of the comment button to prompt a user that the music creator releases the music introduction.

6. The method according to claim 3, wherein the identification comprises a profile photo, an authentication identification, and/or a nickname.

7. The method according to claim 1, further comprising:
   displaying an interaction button at a second associated position of a display area for the target information, wherein a user interacts with the music creator through the interaction button.

8. The method according to claim 7, wherein the interaction button comprises at least one of a like button, a share button, and a reply button.

9. The method according to claim 1, further comprising:
   popping up a reply interface for the target information in response to receiving a first trigger instruction for the target information.

10. The method according to claim 1, further comprising:
    displaying an editing interface for the target information in response to receiving a second trigger instruction for the target information.

11. The method according to claim 1, further comprising:
    displaying a first prompt message on the music-associated page of the music creator in response to a reply of a user to the target information.

12. The method according to claim 1, further comprising:
    pushing user's comment information on music of the music creator to the music creator in accordance with a set frequency.

13. The method according to claim 12, wherein pushing the user's comment information on the music of the music creator to the music creator comprises:
    determining an account of the music creator based on music associated with the target information; and
    pushing the user's comment information to the account.

14. The method according to claim 1, further comprising:
    when a same piece of music has at least two creators, separately displaying the target information input by different creators of the at least two creators on the music-associated page.

15. An electronic device, comprising:
    one or more processors; and
    a storage apparatus configured to store one or more programs,
    wherein the one or more programs, when executed by the one or more processors, cause the one or more processors to implement the method for information release according to claim 1.

16. A non-transitory storage medium containing computer-executable instructions, wherein the computer-executable instructions, when executed by a processor in a user terminal, cause the user terminal to perform operations comprising:
    receiving target information input by a music creator, wherein the target information is to be released through a communication network; and
    displaying the target information released on a music-associated page, wherein the target information comprises a music introduction, and the music-associated page comprises a music comment page which is able to display music comments from different users including the music creator,
    wherein the operations further comprise, after the receiving the target information input by the music creator:
    receiving a selection instruction displayed in an option box of the music comment page, the option box being configured to identify the target information as the music introduction to be released through the communication network; and
    receiving a click on a release icon on the music comment page, the release icon being configured to trigger a release of the target information through the communication network, wherein the displaying the target information released on the music-associated page comprises:

releasing, only on the top of the music comment page, the target information identified as the music introduction and keeping it displayed on the top of the music comment page, in response to the option box having been selected and the release icon being clicked, wherein in response to the option box having been selected and the release icon being clicked, a prompt icon is displayed on a music-playing page of another user terminal in a linkage manner to prompt another user that the music creator has released the music introduction on the music comment page, and the another user jumps to the music comment page with the music introduction displayed on the top, in response to the prompt icon on the music-playing page being triggered.

17. The method according to claim 4, further comprising:

displaying an identification of the music creator at a first associated position of a display area for the target information, wherein the identification comprises a profile photo, an authentication identification, and/or a nickname.

* * * * *